(No Model.) 3 Sheets—Sheet 1.

A. C. EVANS.
FERTILIZING ATTACHMENT FOR SEED PLANTERS.

No. 295,529. Patented Mar. 25, 1884.

Attest.
M. M. Converse
M. F. Rinker

Inventor
Austin C. Evans
B. C. Converse, Att.

(No Model.) 3 Sheets—Sheet 2.
A. C. EVANS.
FERTILIZING ATTACHMENT FOR SEED PLANTERS.
No. 295,529. Patented Mar. 25, 1884.
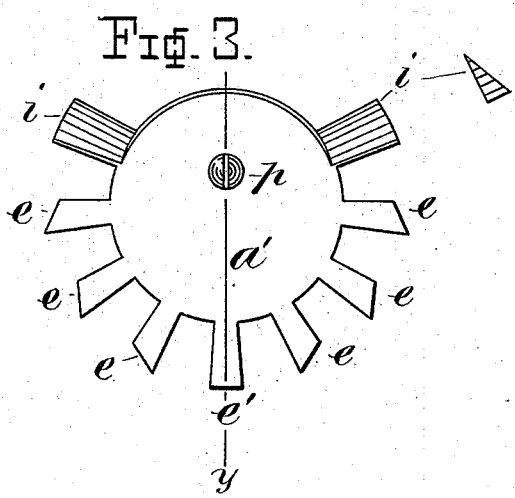
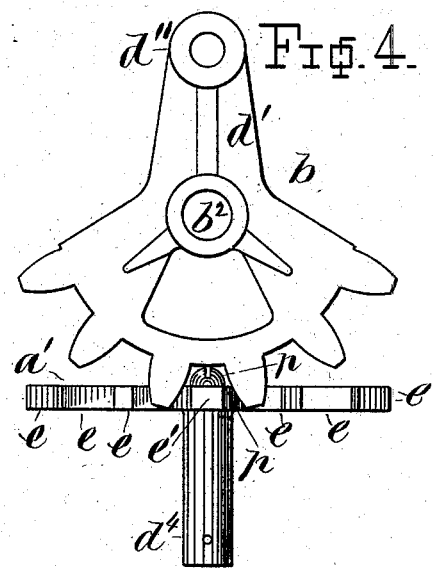
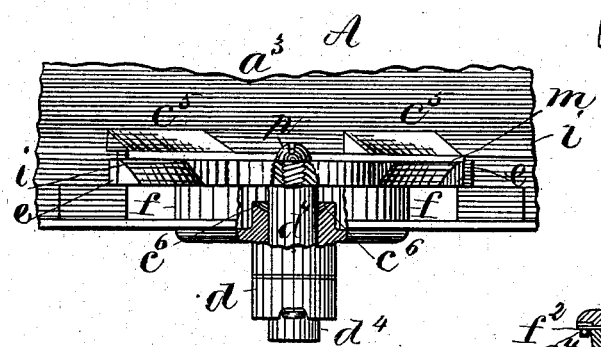
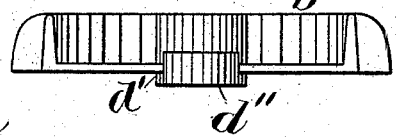
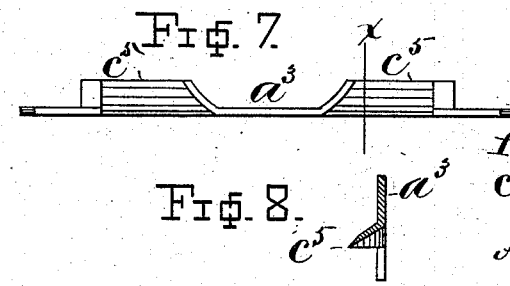
Attest.
M. M. Converse
M. F. Rinker
Inventor.
Austin C. Evans
B. C. Converse
Atty.

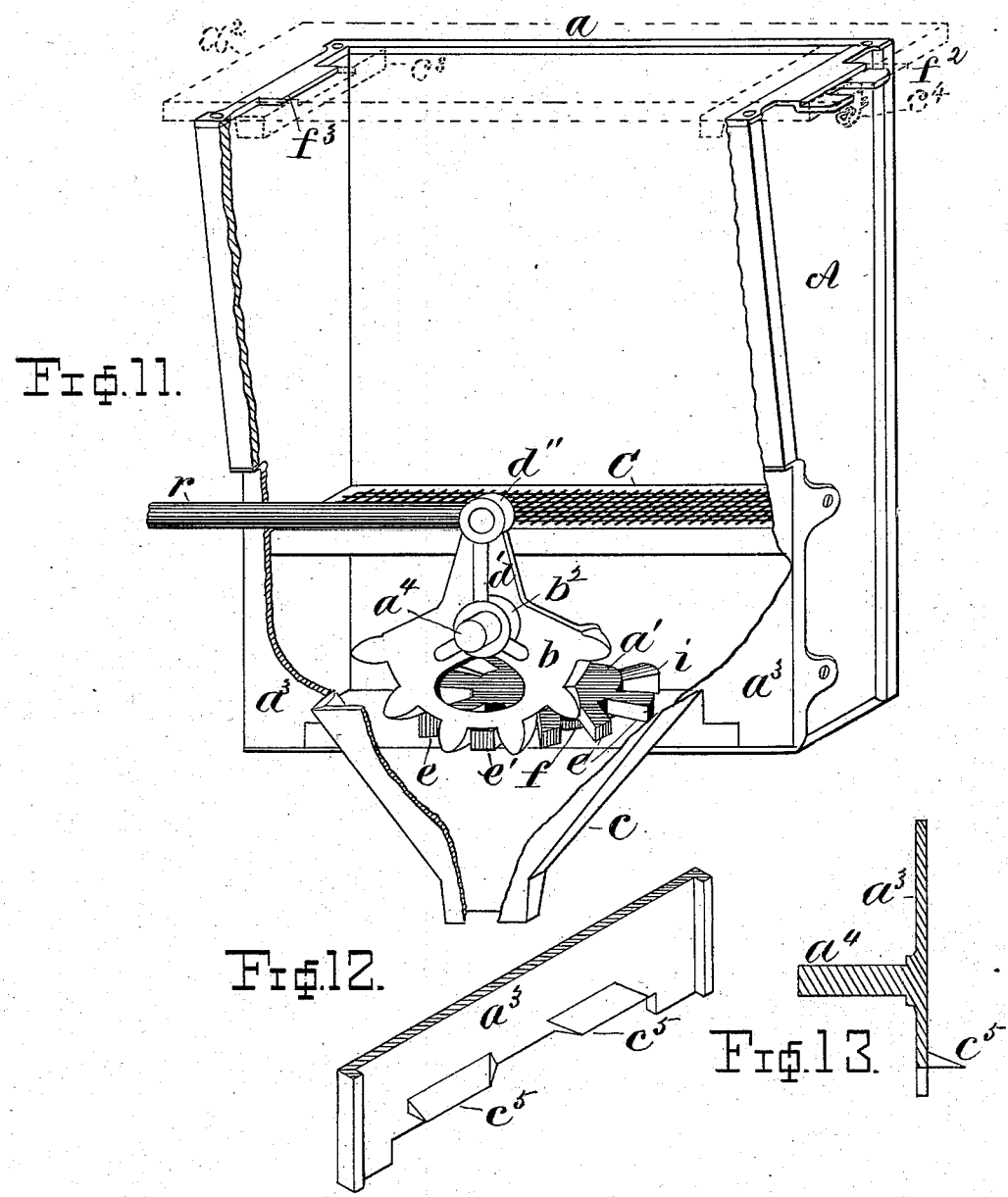

UNITED STATES PATENT OFFICE.

AUSTIN C. EVANS, OF SPRINGFIELD, OHIO.

FERTILIZING ATTACHMENT FOR SEED-PLANTERS.

SPECIFICATION forming part of Letters Patent No. 295,529, dated March 25, 1884.

Application filed November 2, 1883. (No model.)

*To all whom it may concern:*

Be it known that I, AUSTIN C. EVANS, a citizen of the United States of America, residing at Springfield, in the county of Clark and State of Ohio, have invented certain new and useful Improvements in Fertilizing Attachments for Seed-Planters, of which the following is a specification, reference being had therein to the accompanying drawings.

My invention relates to improvements in fertilizing attachments for seed-planters.

This invention consists in a sowing or dropping disk having teeth of novel construction, said disk having an oscillating movement given thereto by a toothed sector pivoted upon the outside of the hopper and engaging with the teeth of the disk, for the purpose of both driving the latter and for discharging the fertilizer substance from the tooth-spaces therein. Said sector is flexibly connected by rods or their equivalents, and a pivoted lever midway between the hoppers, with the slide-bar of the planter, whereby a vibratory movement is transmitted to the sector, and thence to the disk from the slide-bar.

This invention further consists in improvements in other parts connected with the fertilizer attachment, which will be hereinafter described.

Figure 1:
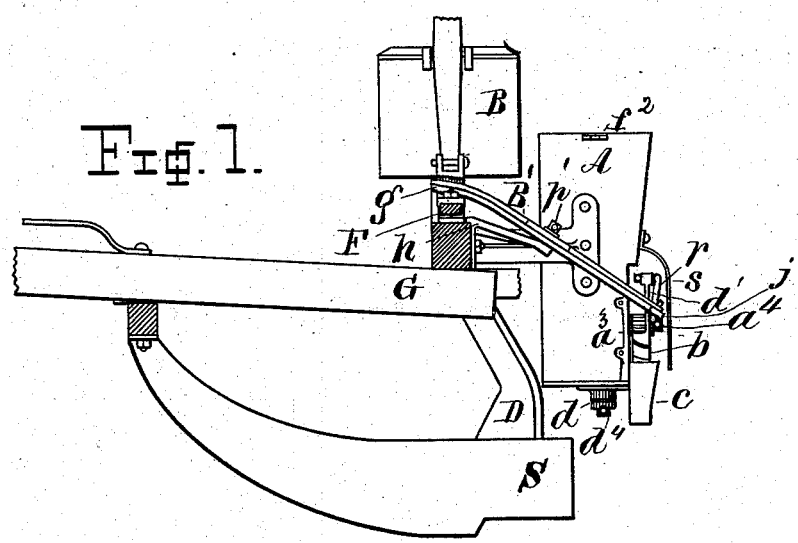
Figure 2:
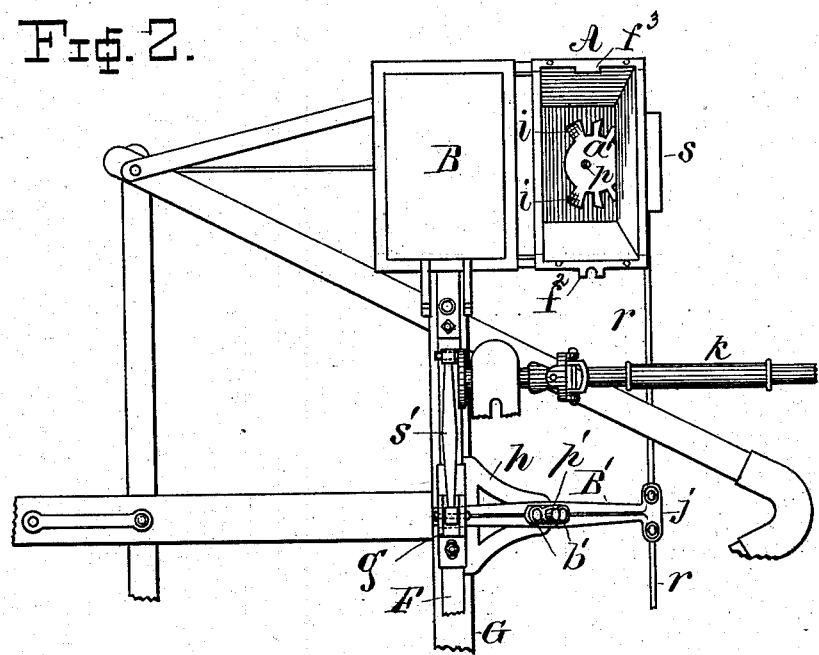

Three sheets of drawings accompany this specification—Sheet 1, with Figures 1 and 2, Sheet 2, with Figs. 3 to 10, inclusive, and Sheet 3, with Figs. 11, 12, and 13.

Fig. 1 is a vertical section, showing the right half of the front section of a corn-planter having my improved fertilizing attachment applied thereto. Fig. 2 is a top view of the same. Figs. 3 to 10 are details. Fig. 11 is an isometric view of the fertilizer-hopper and the connecting devices of the fertilizing attachment. A portion of the rear side of the hopper is broken away to exhibit the screen and the fertilizer-disk and its connections. The lid and its fastenings are shown in dotted lines. Fig. 12 is an inside view of the lower portion of the iron plate which forms a part of the rear wall of the hopper and the cut-offs cast thereon. Fig. 13 is a vertical section through the iron plate $a^3$ of the hopper, and through the journal projecting therefrom, upon which the sector-gear is pivoted.

A is the fertilizer-hopper, which is made of large size, and of about twice the depth of the seed-hopper B in front of it. The fertilizer-hopper is placed in rear of the seed-hopper and secured by brackets to the cross-bar G, and extends low down to near the shoe S, and its discharge-tube is about eight inches in rear of the latter. The hopper has its rear side in two parts, the lower section, $a^3$, being an iron plate with a projecting spindle or journal, $a^4$, cast in one piece therewith, to give strength to this part, on which the toothed sector $b$ is pivoted.

The screen C is placed in the hopper low down, it being only about four inches above the bottom plate, the object being to relieve the disk $a'$ from the weight of the fertilizer substance, which latter is liable to pack together when the hopper is full and the screen is placed near the top, as the latter cannot in that position bear any considerable portion of the weight as it does in the position herein shown. Besides this advantage of relieving the disk from the weight of the fertilizer, that portion of the latter beneath the screen will in consequence remain loose, and can be readily collected and discharged by the sowing-disk, and the machine can be much more easily operated. On the lower edge of plate $a^3$ at the top of the horizontal slot $m$, through which the teeth of the disk $a'$ extend and operate, are two cut-offs, $c^5$. These are cast upon the plate and project inside on either side of the middle line of the hopper over the teeth of the disk. They extend down to a sharp thin edge parallel with the plane of the disk, and have a flaring cavity upon the outside, caused by the angle turned inward which forms them, as seen in the detail Fig. 8, which is a cross-section of the plate on line $x$, Fig. 7, and as it is over the point where the teeth of the disk pass outside of the hopper as the former is oscillated, the cut-off prevents the fertilizer substance from dropping through the opening under the rear wall of the hopper over the sowing-disk, operating in this respect as a shield for that purpose. In Figs. 4 and 11, the sector $b$ is seen in engagement with the dropping or sowing disk $a'$. From the upright arm $d'$ of the sector $b$ extends a connecting-rod, $r$, as seen in Figs. 1, 2, and 11. This rod is flexibly connected with the sector, its end being pivoted in the hub $d''$ at the top of the arm $d'$, and its opposite end is pivoted in the rear end of the downwardly and rearwardly inclined lever B' at the middle of the planter-section in the central longitudinal line of the same. This lever is centrally pivoted upon a pin or journal, $p'$, extending upward from the rear end of a triangular bracket, $h$, and rods $r$ extend from either side of its rear end and connect with the fertilizing devices. The forward end of lever B' extends through a slot or hole in the saddle-block $g$ on the slide-bar F of the planter, it being free to move therein as the slide-bar is operated. The bracket $h$ is bolted to the rear side of cross-bar G, and extends back far enough to pivot lever B' about the center. A series of holes, $b'$, provides for its adjustment, so as to change the throw and impart to the disk a greater or less rotary movement, causing it to discharge more or less fertilizer. The fertilizing attachment may be operated either by the hand-lever of the planter, or automatically in connection with the drill attachment of the latter, when the pitman $s'$ will be used to connect the crank of the tumbling-shaft $k$ with the slide-bar F, the end of the pitman being pivoted between ears upon the top of the saddle-block $g$. (Seen on the middle of the slide-bar in Figs. 1 and 2.) This block is cast with a gain on the under side, which forms a slot or hole (when the block is bolted to the slide-bar) for the end of lever B'.

The hopper is constructed with a tight lid to prevent the escape of ammonia-vapor from the fertilizer, and to prevent moisture from getting therein. This lid is removable and has at one end, on the inner surface, a slotted cleat, $c^3$, and at the other end a downwardly-projecting pin, $c^4$, with a split key inserted through the latter. These engage, respectively, with an inwardly-projecting lug or flange, $f^3$, at one end of the hopper at the top edge, and an outward-projecting fork, $f^2$, at the opposite end of the same, the split key being inserted under the fork-prongs to fasten the lid.

The fertilizer-disk $a'$ is a flat circular plate with radial teeth projecting therefrom of peculiar and novel construction. The front of the disk, as seen in Fig. 3, is devoid of teeth, leaving a space embracing nearly one-third of its circumference. A chisel-shaped tooth, $i$, on either side of this space has its top surface inclined downward from its rear to its front face, leaving the latter sharp throughout its length, as seen in the detail, Fig. 3, the object being to cause these teeth to enter the fertilizer substance easily, making a track for the filling-teeth $e\ e\ e$ (seen on either side in rear of teeth $i$) to follow. The latter teeth have their ends cut off tangentially, so as to leave the face of the tooth toward the front of the hopper shorter than its rear or gathering face, making the tooth raking or gullet-shaped, with its longest angle projecting in line with its rear face. This form of tooth facilitates the collection and discharge of the fertilizer, as it presents a less surface on the front face to enter the fertilizer-dust than upon the rear face to collect it from within the hopper and carry it out through the opening $m$ to discharge it as the disk is operated. It will be noticed that there are two groups of teeth, $e\ e\ e$, one on either side of the middle line, $y$, (seen in Fig. 3,) both operating similarly as they are alternately engaged by the teeth of sector $b$, which oscillates on its bearing over them. Tooth $e'$ in the median line, $y$, is a plain radial tooth with a square end, not being a gathering-tooth, but essential in the engagement of the gear to produce the movement. The disk $a'$ is seen in its operative position from the rear in Figs. 4 and 11, and from the front in Fig. 5. By reference to these figures it will be seen that it oscillates in a horizontal plane upon its vertical shaft $d^4$, and that this shaft is pivoted in the bottom plate of the hopper through the hub or bearing $d$, which is cast integral with said bearing-plate, and extends upward within the ring $f$ (on which the disk is supported) to a little distance below the latter, terminating at the top in a dish-shaped cavity, $c^6$, which forms an oil-cup for the lubrication of the shaft. This cup is reached through a threaded hole in the disk, which is closed and capped by the round-headed screw $p$, as seen in the views Figs. 2, 3, 4, and 5. As the oil-cup is separated by a space from the under side of the disk and is on the top of hub $d^4$, it is protected from the fertilizer-dust during the operation of the devices.

I claim as my invention—

1. In a fertilizing attachment, a horizontal feed plate or disk having its shaft pivoted vertically through the bottom plate of the hopper, (or a hub cast thereon,) and provided with two horizontally-cutting teeth extending radially therefrom—one from either side of a space on its front edge—and having a group of filling-teeth in rear of each cutting-tooth, with inclined points extending tangentially rearward, and a rear tooth square in its cross-section dividing the two groups of filling-teeth.

2. In a fertilizing attachment, the horizontal oscillating disk $a'$, having the chisel-shaped teeth $i$ on either side of a front peripheral space, their front faces inclined downward and forward from the upper to the lower surface of the disk, the raking or gullet-shaped teeth $e\ e\ e$, grouped on either side of the median line, $y$, having their longest points in line with the rear face, and the intermediate tooth, $e'$, between the two groups of teeth $e\ e\ e$ on the rear of the disk.

3. In a fertilizing attachment for a seed-planter, a horizontal oscillating feed-disk, an oscillating toothed sector pivoted vertically over the same, engaging with the teeth of the latter at right angles to the plane of the disk, operating it from side to side, and discharging the fertilizer substance therefrom at the same time.

4. In a fertilizing attachment for a seed-planter, a horizontal oscillating feed-disk pivoted upon a vertical shaft, a central hub through which said shaft extends, and an elevated ring supporting the disk above the hopper-bottom, said disk being operated by a toothed sector pivoted vertically over the same, the teeth of which engage the teeth of the disk at right angles thereto.

5. The combination, with the horizontal oscillating feed-disk having teeth of the form described, of the toothed sector pivoted upon the outside of the hopper above said feed-disk and engaging therewith, said sector being connected by a rod or rods and an intermediate shaker-bar or pivoted lever with the slide-bar of the planter, whereby an oscillatory movement is transmitted to said feed-disk from said slide-bar.

6. In a disk for sowing or dropping fertilizer substance, adapted to have an oscillatory movement, the combination of the group of teeth on either side of the center of oscillation, having their ends terminating in angular points cut tangentially from front to rear perpendicular to the plane of said disk, their rear faces being longer than their front faces, to adapt them to enter the fertilizer substance more easily, and to collect it by means of the long angular points extending from their rear faces, and carry it out from within the hopper to the point of discharge.

7. In a fertilizing attachment for a seed-planter, an oscillating feed-disk pivoted by a vertical shaft, a threaded hole for an oil-inlet through said disk, and a screw for capping the same, in combination with a dish-shaped cavity in the top of the hub or collar under said disk, on the bottom plate of the hopper, said cavity forming a reservoir for the oil with which the shaft of the disk is lubricated.

8. In a fertilizing attachment for a seed-planter, a metal plate, $a^3$, forming the lower section of the rear wall of the hopper, a journal, $a^4$, extending horizontally therefrom, in combination with the toothed sector $b$, pivoted on said journal, and adapted to operate the oscillating disk $a'$ through its connection with the slide-bar of the planter.

9. In a seed-planter having a fertilizing attachment, the combination, with the rotary seed-disks and the slide-bar actuating the same, of the oscillating fertilizer-disks, the toothed sectors engaging therewith, and the auxiliary devices connecting the latter with said slide-bar, as and for the purpose set forth.

In testimony whereof I affix my signature in presence of two witnesses.

AUSTIN C. EVANS.

Witnesses:
B. C. CONVERSE,
F. STATE.